(12) United States Patent
Ono

(10) Patent No.: US 11,119,641 B2
(45) Date of Patent: Sep. 14, 2021

(54) ELECTRONIC APPARATUS AND CONTROL METHOD THEREOF

(71) Applicant: CANON KABUSHIKI KAISHA, Tokyo (JP)

(72) Inventor: Tadayoshi Ono, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 143 days.

(21) Appl. No.: 16/253,977

(22) Filed: Jan. 22, 2019

(65) Prior Publication Data
US 2019/0235743 A1   Aug. 1, 2019

(30) Foreign Application Priority Data
Jan. 26, 2018   (JP) .............................. JP2018-011847

(51) Int. Cl.
| | | |
|---|---|---|
| *G06F 3/0484* | (2013.01) | |
| *H04N 5/57* | (2006.01) | |
| *H04N 5/235* | (2006.01) | |

(52) U.S. Cl.
CPC ...... *G06F 3/04847* (2013.01); *G06F 3/04845* (2013.01); *H04N 5/2353* (2013.01); *H04N 5/57* (2013.01); *G09G 2320/0626* (2013.01)

(58) Field of Classification Search
None
See application file for complete search history.

(56) References Cited

U.S. PATENT DOCUMENTS

| | | | | |
|---|---|---|---|---|
| 6,714,293 | B2 * | 3/2004 | Goto ..................... | G01J 1/4214 |
| | | | | 356/218 |
| 2004/0042791 | A1 * | 3/2004 | Suekane .............. | H04N 5/2351 |
| | | | | 396/661 |
| 2008/0120565 | A1 * | 5/2008 | Stiso ................... | G06F 3/04847 |
| | | | | 715/771 |
| 2011/0064399 | A1 * | 3/2011 | Tohyama ............... | G03B 7/087 |
| | | | | 396/242 |
| 2013/0002924 | A1 * | 1/2013 | Nakajima .............. | G03B 17/18 |
| | | | | 348/333.02 |
| 2015/0350533 | A1 * | 12/2015 | Harris ................. | H04N 5/23293 |
| | | | | 348/362 |
| 2016/0307602 | A1 * | 10/2016 | Mertens ................ | G11B 27/031 |
| 2017/0294174 | A1 * | 10/2017 | Albadawi .......... | A61B 5/02055 |
| 2017/0359524 | A1 * | 12/2017 | Hosono ................ | H04N 9/8205 |
| 2018/0048845 | A1 * | 2/2018 | Kozuka .................. | H04N 11/24 |
| 2019/0222769 | A1 * | 7/2019 | Srivastava ....... | H04N 5/232945 |

FOREIGN PATENT DOCUMENTS

JP   05-056330 A   3/1993

\* cited by examiner

*Primary Examiner* — Yongjia Pan
*Assistant Examiner* — Maria S Ayad
(74) *Attorney, Agent, or Firm* — Cowan, Liebowitz & Latman, P.C.

(57) ABSTRACT

An electronic apparatus that comprises a control unit is disclosed. The control unit displays a user interface for comparably presenting: first brightness that is brightness of an image in which a subject is shot with proper exposure that is based on a first reference value, second brightness that is brightness of an image in which the subject is shot with proper exposure that is based on a second reference value, and third brightness that is brightness of an image in which the subject is shot under current exposure conditions.

11 Claims, 8 Drawing Sheets

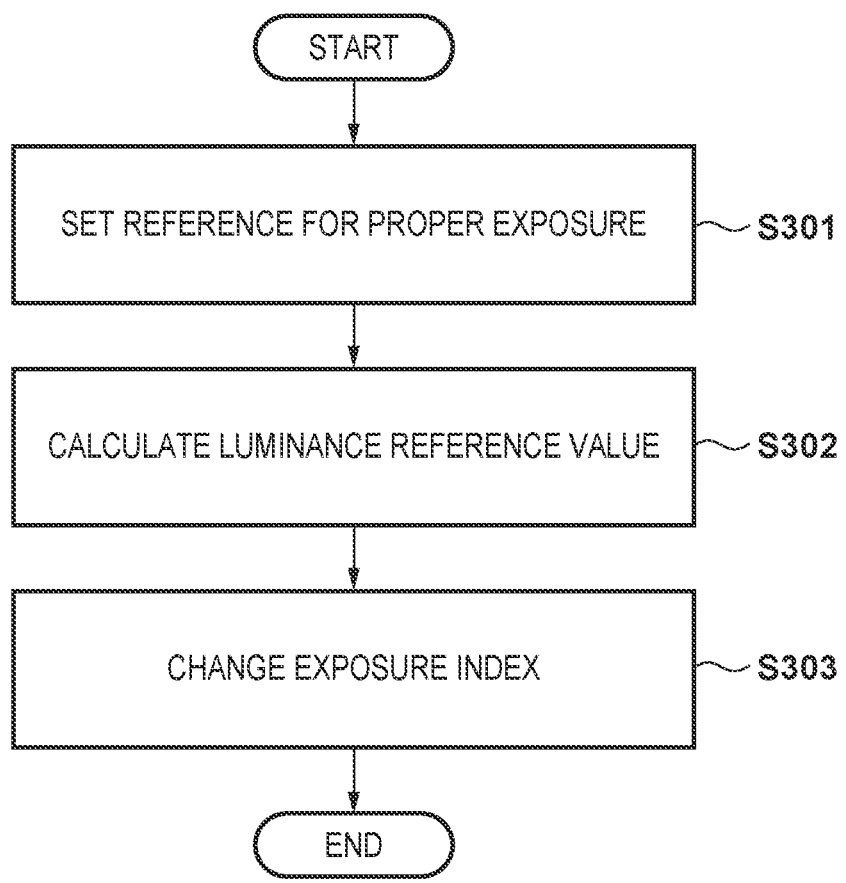

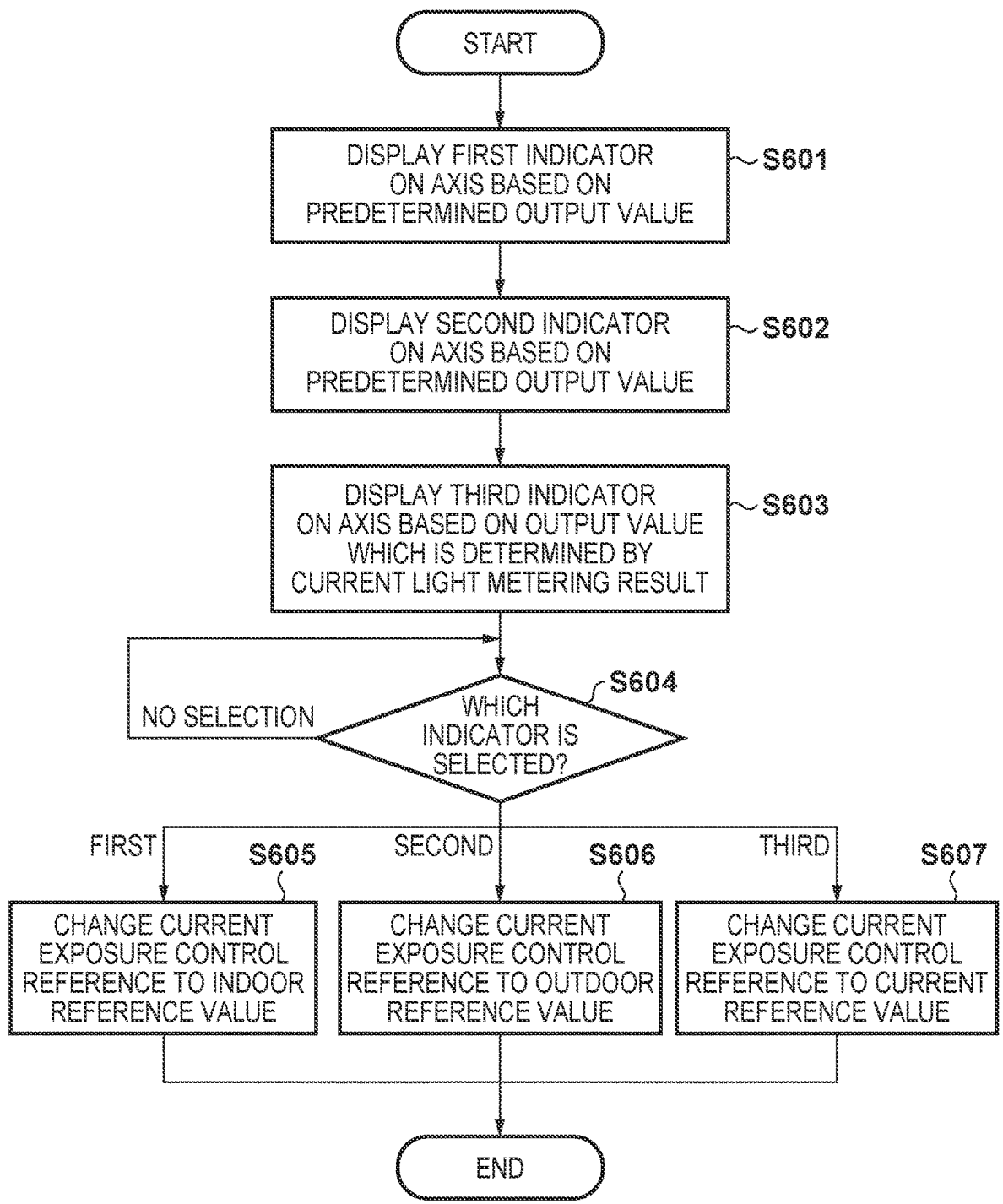

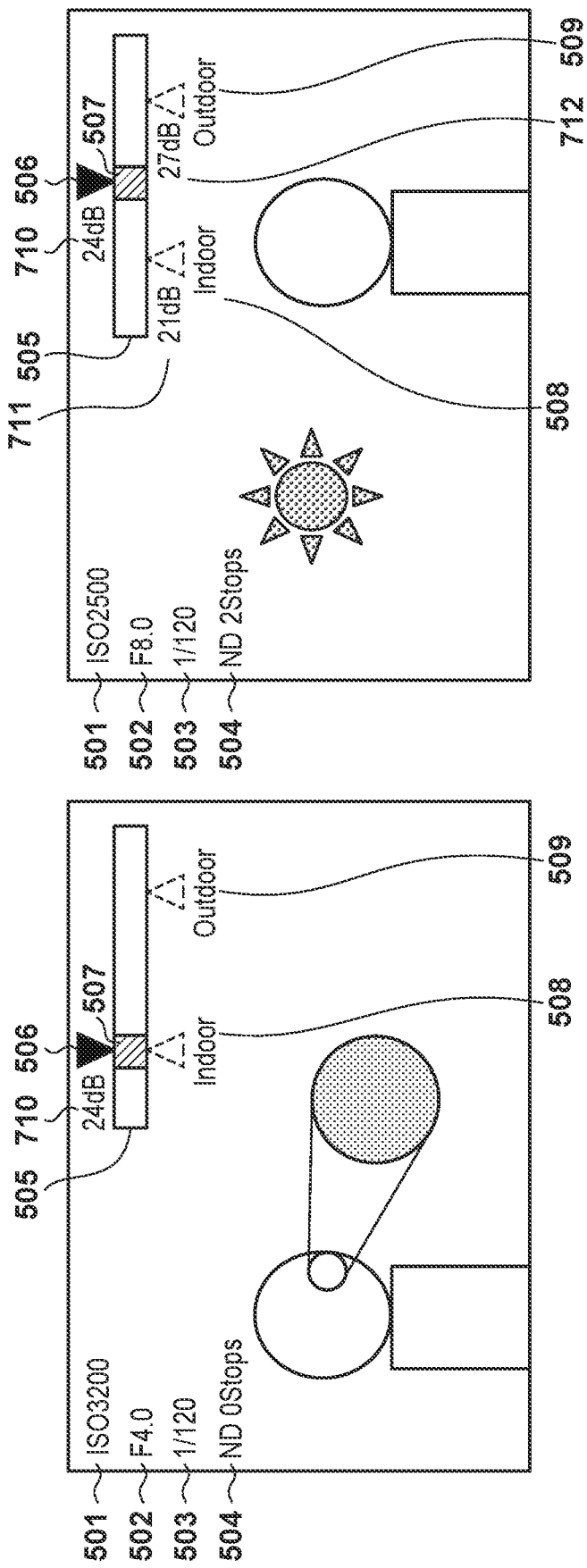

ELECTRONIC APPARATUS AND CONTROL METHOD THEREOF

BACKGROUND OF THE INVENTION

Field of the Invention

The present invention relates to an electronic apparatus and a control method thereof, and in particular relates to an electronic apparatus that has a shooting function and a control method thereof.

Description of the Related Art

Conventionally, some electronic apparatuses that have a shooting function have an automatic exposure control (AE) function for automatically determining exposure conditions (proper exposure condition) for shooting a subject with appropriate brightness and a function for displaying an indicator of proper exposure when the user manually sets exposure conditions. In addition, a function for presenting the difference between exposure conditions that are currently set and proper exposure conditions acquired through automatic exposure control in order to support manual exposure control is also known.

In ordinary automatic exposure control, exposure conditions under which an achromatic color subject with reflectance of 18% has appropriate brightness (an output level) are determined. The exposure conditions that are determined in this manner are appropriate for most shooting. However, there have been cases where appropriate exposure conditions cannot be determined regarding scenes in which a main subject is against a very bright background such as a backlit scene and a snow scene.

In such cases, exposure compensation is necessary, but if exposure compensation is set and shooting is performed, and, after that, it is forgotten to reset the exposure compensation, there have been cases where shooting is performed in the state where a scene for which exposure compensation is not necessary is under exposure compensation. In addition, certain knowledge and operation proficiency are necessary in order to perform exposure compensation of an appropriate amount.

For example, Japanese Patent Laid-Open No. H05-56330 discloses an image capture apparatus that supports shooting in a scene inappropriate for ordinary automatic exposure control, by setting a shooting mode for a sand beach, a snow scene, and the like, and thereby collectively changing a plurality of parameters such as an aperture value and a shutter speed, and a light metering method.

However, since a shooting mode is for shooting a specific subject and scene, and a plurality of parameters are collectively changed, it is not easy to perform shooting under exposure conditions intended by the user. In addition, an aim of a shooting mode is for making it possible to determine proper exposure conditions through automatic exposure control also in a subject for which automatic exposure control is not effective. Therefore, a target value of brightness of the subject is the same as that in normal automatic exposure control, and in the case where brightness of the subject is desired to be intentionally changed, exposure compensation is still required.

For example, if the user can easily change a reference value of proper exposure that is used in automatic exposure control, brightness of an image can be changed without exposure compensation while performing shooting with proper exposure through automatic exposure control, but such a mechanism has not been provided.

SUMMARY OF THE INVENTION

According to the present invention, an electronic apparatus that can change a reference value of proper exposure, and allows the user to easily set brightness of an image that is shot, and a control method thereof are provided.

According to an aspect of the present invention, there is provided an electronic apparatus comprising: a memory and at least one processor and/or at least one circuit to perform the operations of a control unit configured to display a user interface for comparably presenting: first brightness that is brightness of an image in which a subject is shot with proper exposure that is based on a first reference value, second brightness that is brightness of an image in which the subject is shot with proper exposure that is based on a second reference value, and third brightness that is brightness of an image in which the subject is shot under current exposure conditions.

According to another aspect of the present invention, there is provided a control method of an electronic apparatus comprising: displaying a user interface for comparably presenting first brightness that is brightness of an image in which a subject is shot with proper exposure that is based on a first reference value, second brightness that is brightness of an image in which the subject is shot with proper exposure that is based on a second reference value, and third brightness that is brightness of an image in which the subject is shot under current exposure conditions.

According to a further aspect of the present invention, there is provided a non-transitory computer-readable recording medium that stores a program for causing a computer to function as a control unit of an electronic apparatus, wherein the control unit displays a user interface for comparably presenting: first brightness that is brightness of an image in which a subject is shot with proper exposure that is based on a first reference value, second brightness that is brightness of an image in which the subject is shot with proper exposure that is based on a second reference value, and third brightness that is brightness of an image in which the subject is shot under current exposure conditions.

Further features of the present invention will become apparent from the following description of exemplary embodiments with reference to the attached drawings.

BRIEF DESCRIPTION OF THE DRAWINGS

FIG. 3 is a flowchart related to processing for setting a reference value of proper exposure in an embodiment.

FIG. 6 is a flowchart related to an operation of an image capture apparatus according to an embodiment of the invention.

FIGS. 7A to 7E are schematic diagrams showing examples of a user interface according to an embodiment of the invention.

DESCRIPTION OF THE EMBODIMENTS

Figure 1:
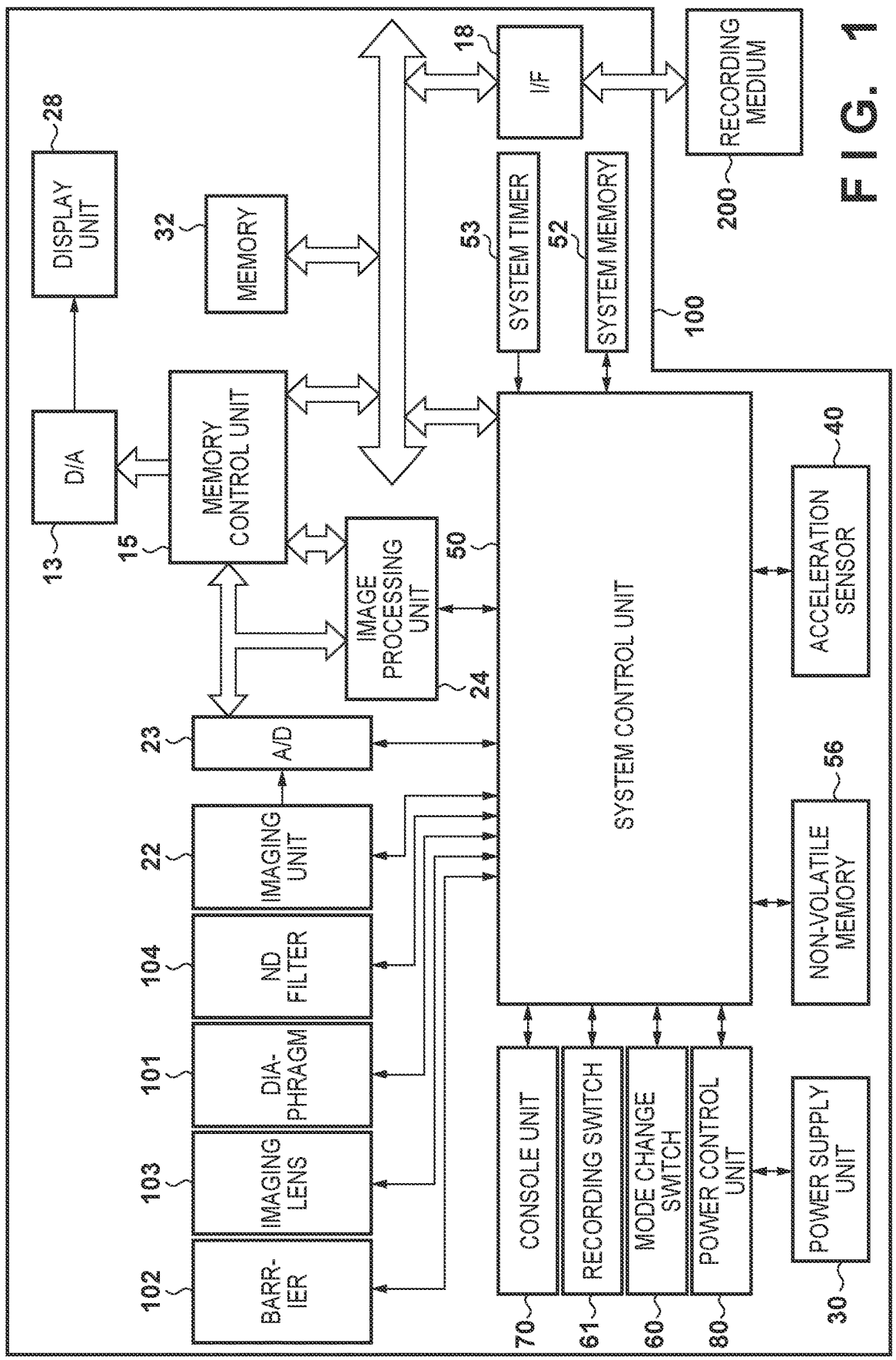
FIG. 1 is a block diagram showing an exemplary function configuration of an image capture apparatus 100 according to an embodiment of the present invention.

Exemplary embodiments of the present invention will now be described in detail in accordance with the accompanying drawings. Note that embodiments will be described below in which the present invention is applied to an image capture apparatus (e.g., a digital camera and digital video camera) that uses an image sensor, but the present invention can be applied to any electronic devices that have an image-capturing function. Note that examples of such electronic devices include smartphones, personal computers, tablet terminals, game machines, and the like in addition to image capture apparatuses, but there is no limitation thereto.

In addition, each of the configurations illustrated in the drawings as functional blocks may be constituted by independent hardware (an ASIC, an ASSP, a discrete circuit, etc.), or a plurality of functional blocks may be constituted by a single item of hardware. In addition, a configuration represented as a functional block may be realized by a programmable processor executing a program.

First Embodiment

FIG. 1 is a block diagram schematically showing an exemplary function configuration of an image capture apparatus 100 according to a first embodiment of the present invention.

An imaging lens 103 is an image-forming optical system constituted by a plurality of lenses, and forms an optical image of a subject on an imaging plane. The imaging lens 103 has a movable lens and a driving mechanism thereof. Examples of the movable lens includes a variable magnification lens, a focus lens, a shift lens, and the like. A movable barrier 102 is provided over the front face of the imaging lens 103. The barrier 102 covers the front face of the imaging lens 103 when the image capture apparatus 100 is turned off, sleeping, or the like, and exposes the front face of the imaging lens 103 in a shooting stand-by state, during photography, and the like.

A diaphragm 101 may also function as a mechanical shutter. An ND filter 104 can be inserted into and removed from a light path, and when inserted into the light path, reduces the light amount.

An imaging unit 22 has an image sensor and a peripheral circuit related to driving of the image sensor. The image sensor may be a CCD/CMOS image sensor in which a plurality of photoelectric conversion portions are arranged two-dimensionally. Examples of the peripheral circuit include a horizontal scanning circuit, a vertical scanning circuit, and the like. A system control unit 50 to be described later can control, through the peripheral circuit, an electric charge accumulation period (electronic shutter speed) of the image sensor, a method for reading out signals from the photoelectric conversion portions (for example, readout with or without addition or thinning), signal gain, and the like. Analog image signals that are read out in units of pixels or photoelectric conversion regions, and have values that are based on the amount of incident light (subject luminance) are output from the imaging unit 22.

An A/D converter 23 converts analog image signals that are output from the imaging unit 22 into digital image signals (image data). The A/D converter 23 outputs digital image signals to an image processing unit 24 or a memory control unit 15.

The image processing unit 24 applies various types of image processing to image data (input data) that is supplied from the A/D converter 23 or the memory control unit 15. The image processing unit 24 outputs an image processing result to the memory control unit 15 or a system control unit 50 in accordance with applied processing. Examples of image processing that is applied by the image processing unit 24 include pixel interpolation (demosaic) processing, resize processing, color conversion processing, gamma correction processing, white balance adjustment processing, processing for adding a digital gain, and the like. In addition, the image processing unit 24 can also generate evaluation values and image signals that are used for automatic exposure control (AE) and automatic focus detection (AF), detect motion vectors, and detect a region (for example, a face region) that has a specific feature. For example, the image processing unit 24 can calculate average luminance of a face region, average luminance of one entire frame, and the like as luminance information of a captured image of one frame. The image processing unit 24 further encodes still image or moving image data to record the image, and decodes encoded still image or moving image data to display the image, for example.

The system control unit 50 realizes functions of the image capture apparatus 100 by controlling operations of constituent elements of the image capture apparatus 100. For example, the system control unit 50 may be one or more programmable processors (e.g., CPUs or MPUs). In this case, the system control unit 50 controls operations of the constituent elements of the image capture apparatus 100 by reading a program stored in a non-volatile memory 56, for example, to a system memory 52, and executing the program.

At least a portion of the non-volatile memory 56 is rewritable. The non-volatile memory 56 stores programs that can be executed by the system control unit 50, constants such as setting values, data for displaying a GUI such as a menu screen, unique information of the image capture apparatus 100, and the like.

The system memory 52 is a memory that is used by the system control unit 50, and is used for temporarily storing programs, variables and constants, and information required for executing a program.

The system control unit 50 also controls display on a display unit 28. Furthermore, the system control unit 50 controls the imaging lens 103, the diaphragm 101, the ND filter 104, the imaging unit 22, and the like using luminance information of a captured image calculated by the image processing unit 24, various evaluation values, and the like, so as to execute AE and AF.

An acceleration sensor 40 that is a gyro sensor, for example, outputs a signal indicating a change in movement and the orientation of the image capture apparatus 100 to the system control unit 50. For example, the system control unit 50 can perform image stabilization according to a signal from the acceleration sensor 40 by changing the position of the shift lens of the imaging lens 103 or a range in which signals are read out from the image sensor of the imaging unit 22.

A memory 32 temporarily stores image data and sound data through the memory control unit 15 and the system control unit 50. For example, the memory 32 is used as a buffer during continuous shooting, and stores image data captured by the imaging unit 22 and converted into digital data by the A/D converter 23, and image data to be displayed on the display unit 28. The memory 32 has a storage capacity sufficient for storing moving image and sound for a predetermined time.

In addition, a portion of the memory 32 is also used as a memory for screen display (video memory). A D/A converter 13 converts, into analog signals, image data that is stored in the memory 32 and is to be displayed, and supplies the analog signals to the display unit 28 that is an LCD or the like. Accordingly, a captured image, a GUI, information regarding the image capture apparatus, and the like are displayed on the display unit 28. The display unit 28 is also used as an electric viewfinder. In this case, the system control unit 50 controls an operation of shooting a moving image using the imaging unit 22, an operation of generating image data for display from a shot moving image and writing the generated image data to the memory 32, and an operation of reading out image data for display from the memory 32, D/A converting the image data, and supplying the image data to the display unit 28.

A system timer 53 generates signals for controlling various timings based on a built-in timepiece or a built-in clock, and supplies the generated signals to the system control unit 50. A mode change switch 60, a recording switch 61, and a console unit 70 constitute an input device group for the user to input an instruction to the image capture apparatus 100. In addition, if the display unit 28 is a touch display, the display unit 28 also functions as an input device for the user to input an instruction to the image capture apparatus 100. Operations of these input devices are detected by the system control unit 50. The system control unit 50 controls constituent elements so as to perform an operation that is based on a detected operation.

For example, the image capture apparatus 100 operates in one of a plurality of operation modes including a moving image recording mode, a still image recording mode, and a playback mode, and an operation mode can be selected (switched) using the mode change switch 60. Note that the moving image recording mode and the still image recording mode may be further subdivided into sub modes such as an automatic shooting mode, an automatic scene determination mode, a manual mode, various scene modes, a program AE mode, and a custom mode. A scene mode is a mode in which setting suitable for shooting is performed by designating one from among representative types of shooting scenes. A configuration may be adopted in which all the modes can be directly selected by operating the mode change switch 60. Alternatively, a configuration may also be adopted in which the moving image recording mode, the still image recording mode, the playback mode are selected using the mode change switch 60, and the sub modes are selected using another console member.

The system control unit 50 switches between a shooting stand-by state and a shooting (recording) state every time the recording switch 61 is operated in the moving image recording mode. Note that a configuration may be adopted in which, if an operation on the recording switch 61 is detected in the still image recording mode or playback mode, the system control unit 50 switches the operation mode to the moving image recording mode so as to start recording a moving image. Note that shooting (recording) of a still image is executed when an operation on a release button included in the console unit 70 is detected. Operations related to shooting and recording a moving image and still image can be performed using a known method, and thus a detailed description thereof is omitted. If an operation on the release button is detected when a moving image is being recorded, the system control unit 50 may execute an operation of recording a still image. The system control unit 50 stores, in data files, still images and moving images acquired through shooting, and records the data files in a recording medium 200.

The console unit 70 may include a menu button, a power switch, a console member for designating a direction (for example, four direction keys or a joystick), a determination (set) button, and the like in addition to the release button. In addition, a combination of GUI parts that are displayed on the display unit 28 and a console member (a touch panel, buttons, etc.) associated therewith also function as an input device that constitutes the console unit 70.

A power control unit 80 comprises a DC-DC converter, a switch circuit for switching a block that is to be energized, and the like. The power control unit 80 detects, as a state of the power supply unit 30, whether or not power is supplied from the outside, whether or not a battery is mounted, the type of the battery, the battery remaining capacity, and the like. In addition, the power control unit 80 controls a voltage that is supplied to constituent elements including the recording medium 200 by controlling the DC-DC converter based on these detection results and an instruction of the system control unit 50. The power supply unit 30 is constituted by a detachable primary battery and secondary battery, an AC adapter, and the like.

A recording medium I/F 18 is an interface to the recording medium 200. The recording medium 200 may be a memory card, a hard disk drive, or the like. The recording medium 200 may be built in or detachable from the image capture apparatus 100. In addition, there may be a plurality of recording mediums 200.

Method for Determining Proper Exposure

Next, a method for determining proper exposure that is used for AE processing and the like, in the image capture apparatus 100, will be described. Proper exposure corresponds to an exposure amount with which a luminance evaluation value of an image within a light metering range matches a predetermined reference value. Therefore, proper exposure for the same shooting scene can differ according to the light metering range, a method for calculating a luminance evaluation value, and the reference value. In addition, proper exposure is represented as a value indicating a reference (0 level) when the user performs exposure compensation. Therefore, when the user performs exposure compensation, it is possible to perform, using a value indicated by proper exposure as the reference (0 level), positive or negative exposure compensation of any stop (one stop corresponds to 1 Ev) according to exposure in APEX units, for example.

A luminance evaluation value is generated by the image processing unit 24 from data of an image acquired through shooting (before gamma correction processing is applied). The luminance evaluation value can be calculated using data of an image included within the light metering range. In an ordinary image capture apparatus, a light metering range and a method for calculating a luminance evaluation value can be selected from a plurality of options (light metering modes). For example, a configuration can be adopted in which at least one of a representative luminance for an entire image and representative luminances for one or more partial images is obtained, and a final luminance evaluation value is obtained based on one or more representative luminances. In the case of using a plurality of representative luminances, it is possible to increase the weight of the representative luminance of a central portion or a face region of the image. A representative luminance may be an average luminance or an integration value of a luminance, for example. Note that a method for calculating a luminance evaluation value described here is merely exemplary, and a luminance evaluation value may be calculated using another method.

Note that, in the case of calculating a luminance evaluation value from data of an image acquired using an image sensor that has color filters, each pixel has only luminance information corresponding to one of the color components of the color filters. Therefore, a luminance evaluation value may be calculated only from the value of a pixel corresponding to a specific color component.

On the other hand, brightness of an achromatic color subject with reflectance of 18% (a standard reflecting body) is used for a reference value of luminance. Exposure conditions are determined such that the exposure amount is increased if the luminance evaluation value is lower (darker) than a reference value of luminance, and the exposure amount is decreased if the luminance evaluation value is higher (brighter) than the reference value of luminance. In other words, if a luminance evaluation value that is actually acquired is lower than the reference value, the exposure amount is increased, and if the luminance evaluation value is higher than the reference value, the exposure amount is decreased, using, as a reference value, a luminance evaluation value in the case where an image within the light metering range is assumed to be an image acquired by shooting an achromatic color subject with reflectance of 18%. The exposure amount can be increased by opening the diaphragm (reducing the aperture value), increasing the shooting sensitivity, decreasing the shutter speed (extending the electric charge accumulation period), decreasing the density of the ND filter (or withdrawing the ND filter from the light path), or the like. It is sufficient that such control is performed in the opposite directions to decrease the exposure amount.

If the luminance evaluation value appropriately represents the brightness of a subject (main subject) intended by the photographer, proper exposure that is determined by performing such automatic exposure control functions desirably. On the other hand, if the luminance evaluation value does not appropriately represent the brightness of a main subject, proper exposure does not function desirably. For example, in a scene in which the ratio of a main subject in the image is low, and the brightness of the background is largely different from the brightness of the main subject, the main subject is too dark or too bright with proper exposure acquired by performing automatic exposure control. Examples of such a scene include a backlit scene, a scene in which a snow scene or a night sky is used as a background, and the like. In addition, in the case where a main subject is a person, if the color of his or her clothing is bright, underexposure tends to occur, and if the color of the clothing is dark, overexposure tends to occur.

This problem is caused by determining an exposure value based on reflected light of an entire scene including a main subject. Therefore, if exposure is determined based on the amount of incident light of the main subject using an exposure meter of an incident light system that is separate from the image capture apparatus 100, exposure can be determined without being affected by the background of the main subject and the brightness and color of the clothing.

When the illuminance value of illumination light that is illuminating a subject, the aperture value of the image capture apparatus 100, an exposure time, and shooting sensitivity are expressed in APEX (additive system of photographic exposure) units, Expression 1 holds during proper exposure.

$$AV+TV=IV+SV \qquad (1)$$

AV is an aperture value (F value), TV is an exposure time (a shutter speed or electric charge accumulation period), IV is an illuminance value, and SV is a value acquired by converting an exposure index (ISO sensitivity, etc.) into APEX units. Note that any parameter related to an amplification factor when amplifying and outputting input data corresponding to light that is incident to the image sensor may be used as an exposure index. Any method can be adopted as this signal amplification method, and examples of the method include adjustment of ISO sensitivity and adjustment of a digital gain during image capturing, change in gamma curve, and the like.

By measuring the amount of incident light (illuminance value) in a portion having the same brightness as a subject region for which proper exposure is desired, and determining a combination of AV, TV, and SV that satisfy Expression 1, it is possible to determine exposure conditions that cause proper exposure.

On the other hand, in the case of determining an exposure value based on reflected light of a subject as with the case of AE of the image capture apparatus 100, when subject luminance, an aperture value of the image capture apparatus 100, an exposure time, and shooting sensitivity are expressed in APEX units, the relationship between their values during proper exposure fulfills Expression 2 below.

$$AV+TV=BV+SV \qquad (2)$$

BV is a value acquired by converting subject luminance into APEX units.

Letting the above-described luminance evaluation value be BV, it is possible to determine exposure conditions that cause proper exposure, by determining a combination of AV, TV, and SV so as to satisfy Expression 2.

Gamma Correction

Figure 2A:
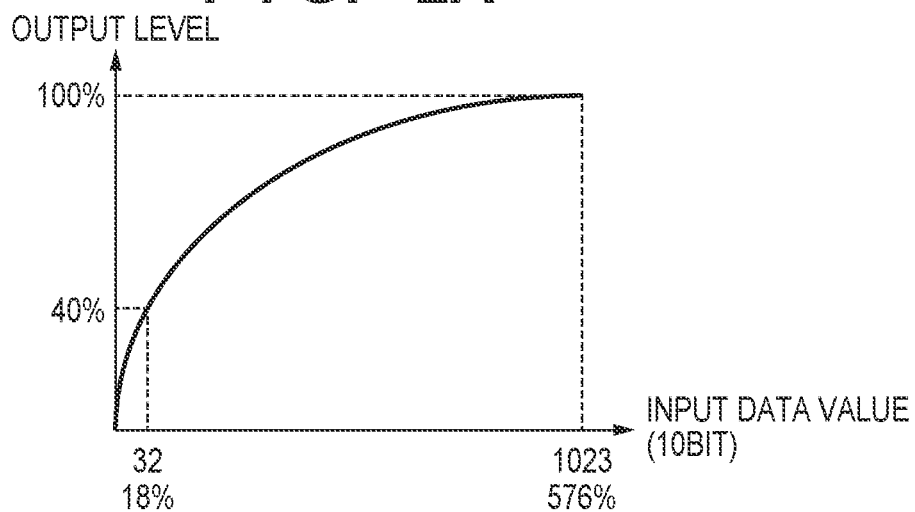
FIGS. 2A to 2C are diagrams showing an example of a gamma curve according to an embodiment.
Figure 2B:
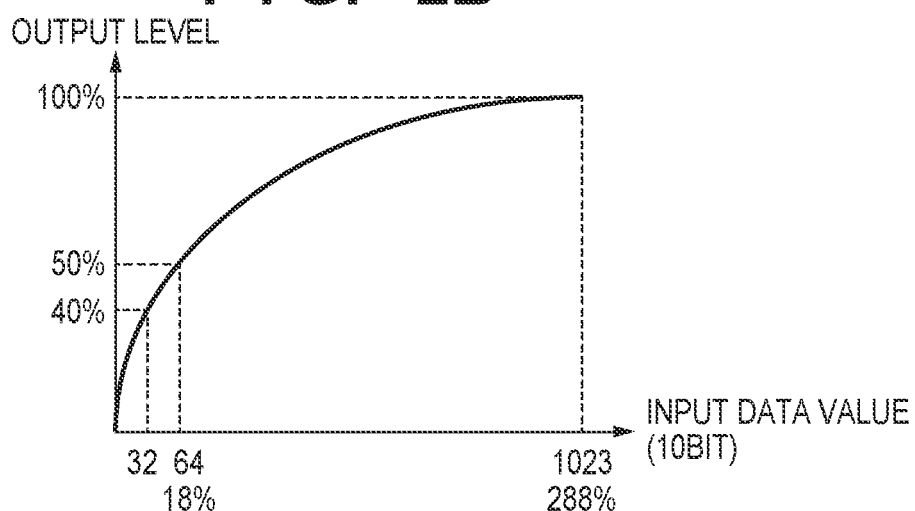
Figure 2C:
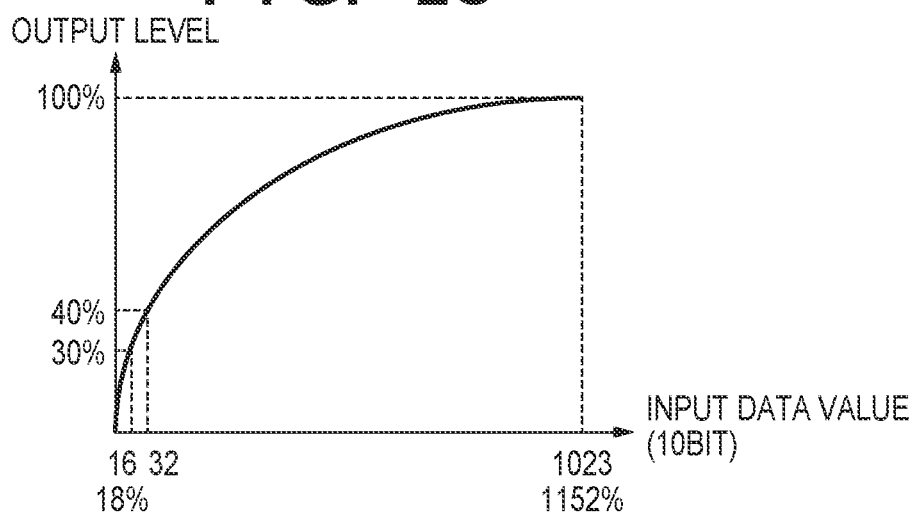

FIGS. 2A to 2C are diagrams showing an example of characteristics of gamma correction (a gamma curve) that is applied to image data (input data) supplied from the A/D converter 23, for example, in the image processing unit 24. Here, the input data is 10-bit data that takes a value corresponding to subject luminance. In addition, examples of a gamma curve for conversion into image signals with an output level (brightness) of 0 to 100% are shown. For example, an output level of 100% is equivalent to a luminance level of 100% white of an image signal. Gamma correction is performed to convert image data, for example, from characteristics of luminance that is output by the image sensor into, for example, gradation characteristics adapted for human visual sense characteristics or gradation characteristics suitable for postproduction. Gamma correction generally has a non-linear conversion characteristic, and a curve representing conversion characteristic is called a gamma curve. It can also be said that gamma correction processing in the image processing unit 24 is gradation conversion processing in which a gamma curve is used.

A luminance reference value that is compared with a luminance evaluation value calculated from image data by the image processing unit 24 is represented as a numerical value suitable for processing in the image processing unit 24, and thus it is difficult for the user to imagine the brightness of the luminance reference value. For example, as shown in FIG. 2A, if the image processing unit 24 handles image data as 10-bit data, and a maximum input value (1023) from the image sensor corresponds to reflectance of 576%, the luminance reference value is an input value of 32 corresponding to the reflectance of 18%.

Therefore, if the luminance evaluation value is 32, the system control unit 50 determines that proper exposure is achieved with the current exposure conditions, and there is no need to change the exposure conditions. On the other hand, if the luminance evaluation value is not 32, the system control unit 50 changes the exposure conditions so as to achieve proper exposure. Note that the luminance reference value varies according to the magnitude of reflectance corresponding to the maximum output value of the image sensor.

In this embodiment, the output level when a subject with reflectance of 18% is shot with proper exposure (the output level that is acquired by converting a luminance reference value based on a gamma curve) is used as the reference value of proper exposure. For example, in the case of using the gamma curve in FIG. 2A, the reference value of proper exposure corresponds to an output level of 40%. By using an output level after gamma correction as a reference value of proper exposure in this manner, the reference value of proper exposure can be handled in a similar manner to a level when video signals are displayed on a waveform monitor, and thus the brightness of the reference value can be easily imagined.

Here, making the subject appear more brightly than during proper exposure is equivalent to converting an input data value corresponding to reflectance of 18% into an output level that is higher than 40%, as shown in FIG. 2B, for example. This can be realized by increasing the reference value of proper exposure.

An operation of changing a reference value of proper exposure will be described with reference to the flowchart in FIG. 3.

In step S301, the system control unit 50 accepts setting of an output level that is used as a reference value of proper exposure. For example, the system control unit 50 causes the display unit 28 to display a screen for setting a reference value, and thus can accept setting of an output level made by the user. In the setting screen, the user can set an output level to have as a reference value by selecting an output level to be used from a plurality of options or directly inputting a numerical value. Note that the options do not need to be numerical values, and may be item names of usages (for example, indoor usage and outdoor usage) or the like that allow the user to easily perform setting. In this case, the system control unit 50 can obtain an output level corresponding to an option by referring to the non-volatile memory 56, for example. Note that a function for adjusting the value of an output level or a function for selecting a specific option may be assigned to an input device included in the console unit 70 instead of providing a setting screen.

When the output level is set in step S301, the system control unit 50 obtains, in step S302, a reference value of luminance based on the output level that has been set and a gamma curve (conversion characteristic). For example, in the case where the gamma curve shown in FIG. 2B is being used, if the output level that is used as proper exposure is set to 50%, the reference value of luminance is 64. The reference value of luminance corresponds to reflectance of 18%, and thus the reflectance to which a maximum value 1023 of input data corresponds is 288% ($\approx 18*1024/64$).

Changing a reference value of luminance from 32 to 64 is equivalent to brightening proper exposure by one stop, and can be said to be subtracting 1 from the AV value or the TV value or adding 1 to the BV value in Expression 2, for example. In this case, by subtracting 1 from the SV value, Expression 2 can be fulfilled. In S303, the system control unit 50 subtracts 1 from the SV value by halving an exposure index (ISO sensitivity corresponding to proper exposure) according to a change in the luminance reference value.

Note that, in this state, the aperture value and the shutter speed were not changed before and after changing the reference value of proper exposure. Therefore, Expression 2 is not fulfilled, and changed proper exposure cannot be acquired under the exposure conditions under which proper exposure before being changed is acquired. Here, the proper exposure has been changed to acquire higher brightness than before, and thus if shooting is performed under exposure conditions under which proper exposure before being changed is acquired, the subject appears darker than with the changed proper exposure. In view of this, in the case where the reference value of proper exposure has been changed, the exposure conditions may be changed so as to cancel the change. In the case of this embodiment, by subtracting 1 from the AV value or the TV value, Expression 2 can be satisfied. In other words, it is sufficient that the F value of the diaphragm 101 is decreased by one stop, or the shutter speed (or the electric charge accumulation period) is doubled. Accordingly, it is possible to set exposure conditions under which changed proper exposure is acquired.

In this embodiment, a configuration is adopted in which the user can change a reference value of proper exposure. Therefore, for example, if a switch between a reference value for indoor photography and a reference value for outdoor photography is possible, the user can always adjust the exposure amount using, as a reference, an indicator of proper exposure indicated by a built-in exposure meter or an external exposure meter. There is no need to manage the exposure compensation amount that is necessary when the reference value of proper exposure is fixed, and it is possible to prevent a shooting failure due to an error of the exposure compensation amount.

In addition, the setting of the reference value of proper exposure can be performed at an output level after gamma correction, and thus it is easy to imagine the brightness of the subject when shooting is performed with proper exposure, and it is possible to easily set a reference value of proper exposure for realizing the brightness of the subject intended by the user.

A configuration is also adopted in which exposure conditions are changed in accordance with a change in the reference value of proper exposure. Therefore, even after the reference value of proper exposure is changed, Expressions 1 and 2 hold true. Accordingly, it is easy to understand exposure conditions under which proper exposure is achieved using the external exposure meter, and to perform setting of exposure conditions in reference with the reference value of proper exposure displayed on the display unit 28 of the image capture apparatus 100. Furthermore, the reference value of proper exposure can be changed, and thus exposure compensation of any stop in which this reference value is used as 0 level is possible, and exposure conditions can be set more accurately for brightness intended by the user.

For example, in the case of shooting a moving image that is based on a high dynamic range (HDR) stipulated in ITU-R Recommendation BT. 2100, image capturing with brightness that is appropriate to the scene is preferred, for example, capturing an image of a subject more darkly in indoor photography and more brightly in outdoor photography. In this embodiment, it is possible to easily change the reference value of proper exposure in each of indoor photography and outdoor photography, and thus in the case of outdoor photography, it is possible to easily shoot a brighter moving image than in indoor photography, while using automatic exposure control.

Note that the gamma curves, the number of bits of the input data value, and the like that have been used in this embodiment for description are merely exemplary, and the present invention is not limited thereto.

Second Embodiment

Next, a second embodiment of the present invention will be described. In the first embodiment, a configuration has been described in which a reference value of proper exposure is changed by designating an output level. In this embodiment, a configuration will be described in which a reference value of proper exposure is changed by designating a dynamic range. The configuration of an image capture apparatus and determination on proper exposure based on Expressions 1 and 2 are similar to those in the first embodiment. Here, a dynamic range indicates a degree of brightness of a subject that can be expressed with respect to a reference value of luminance corresponding to proper exposure. Specifically, the dynamic range can be represented as reflectance (X %) corresponding to the maximum input value (1023 in the case of 10-bit input) when a reference value of luminance corresponding to proper exposure is set to reflectance of 18%. Alternatively, the dynamic range can also be represented as the number of stops in APEX units as follows: dynamic range [APEX]=$\log_2$ (X %/18%).

With the reference value of proper exposure shown in FIG. 2A, the dynamic range (reflectance) is 576%. This indicates that it is possible to represent a subject whose brightness is up to five stops (=$\log_2$ (576/18)) over from proper exposure (reflectance 18%). However, there are cases where it is desired to further expand the dynamic range such as a case of shooting a bright sky or a light source.

In view of this, in this embodiment, it is made possible to set a reference value of proper exposure based on a magnitude of a dynamic range. For example, the system control unit 50 displays, on the display unit 28, a screen that allows a magnitude of a dynamic range to be set, as a reference value setting screen, and thereby can accept setting performed by the user. In the setting screen, the user can set a dynamic range by selecting a dynamic range that the user desires to realize from a plurality of options, or directly inputting a numerical value (for example, reflectance or a number of stops). Note that the options do not need to be numerical values, and may be item names of usages (for example, indoor usage and outdoor usage), types of a subject (for example, a blue sky and a snow scene), widening the dynamic range to be wider than the standard and narrowing the dynamic range to be narrower than the standard, or the like, that allow the user to easily perform setting. Note that a function for adjusting a value of a dynamic range or a function for selecting a specific option may be assigned to an input device included in the console unit 70, instead of providing the setting screen. In this case, the system control unit 50 can obtain a dynamic range corresponding to an option by referring to the non-volatile memory 56, for example. A dynamic range itself is not a reference value of proper exposure, but the reference value of luminance for proper exposure changes by changing the dynamic range, and thus setting of a dynamic range is substantially equal to setting a reference value of luminance for proper exposure.

As shown in FIG. 2C, when the dynamic range is widened by one stop to have six stops (the maximum reflectance of 1152%), a reference value of luminance (reflectance of 18%) equivalent to proper exposure is 1024*18/1152≈16. In this manner, in step S302, the system control unit 50 calculates a reference value of luminance based on the dynamic range that has been set in step S301. Accordingly, an output level corresponding to the reference value of luminance changes from 40% to 30%.

Contrary to the first embodiment, changing the reference value of luminance from 32 to 16 is equivalent to darkening the proper exposure amount by one stop (adding 1 to the AV value or the TV value). In order to fulfil Expression 2 for a changed proper exposure amount, the system control unit 50 doubles the exposure index (ISO sensitivity corresponding to proper exposure) so as to add 1 to the SV value, according to the change in the luminance reference value.

Also in this embodiment, exposure conditions can be changed in order to acquire a changed proper exposure amount. For example, in the case where exposure conditions under which a proper exposure amount before being changed is acquired are set, the system control unit 50 adds 1 to the AV value or the TV value so as to cancel the change in the reference value of proper exposure. In other words, by increasing the F value of the diaphragm 101 by one stop, or halving the shutter speed (or the electric charge accumulation period), it is possible to set exposure conditions under which changed proper exposure is acquired.

In this embodiment, a configuration is adopted in which the user can change the reference value of proper exposure by setting a dynamic range. Therefore, for example, if a switch between a dynamic range for indoor photography and a dynamic range for outdoor photography is possible, the user can always adjust an exposure amount using, as a reference, an indicator of proper exposure indicated by a built-in exposure meter or an external exposure meter. There is no need to manage the exposure compensation amount that is necessary when the reference value of proper exposure is fixed, and it is possible to prevent a shooting failure due to an error of the exposure compensation amount.

In addition, by setting a dynamic range, a change is made to an appropriate reference value of proper exposure, and thus it is possible to easily set an appropriate reference value of proper exposure corresponding to a subject maximum luminance desired by the user.

In addition, exposure conditions are changed according to a change in the reference value of proper exposure. Therefore, even after the reference value of proper exposure is changed, Expressions 1 and 2 hold true. Accordingly, it is easy to understand exposure conditions under which proper exposure is acquired using an external exposure meter, and to set exposure conditions in reference with a reference value of proper exposure that is displayed on the display unit 28 of the image capture apparatus 100.

Note that the gamma curves, the number of bits of the input data value, and the like that have been used in this embodiment for description are merely exemplary, and the present invention is not limited thereto.

Third Embodiment

Next, a third embodiment of the present invention will be described. This embodiment relates to a user interface (UI) useful in an image capture apparatus that can change a reference value of proper exposure. This embodiment can be executed in combination with the first and second embodiments, and thus description will be given using the configuration of the image capture apparatus 100. In addition, as shown in FIG. 2A, reference values of proper exposure before being changed are set to an output level of 40% and an input data value (luminance) of 32.

Figure 4A:
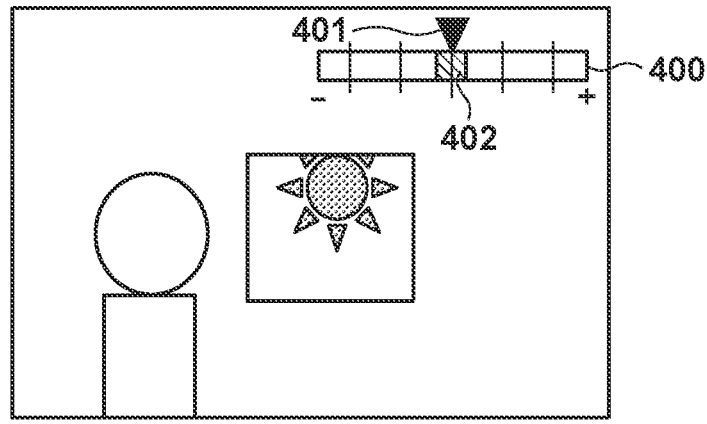
FIGS. 4A to 4C are schematic diagrams showing examples of a conventional user interface.
Figure 4B:
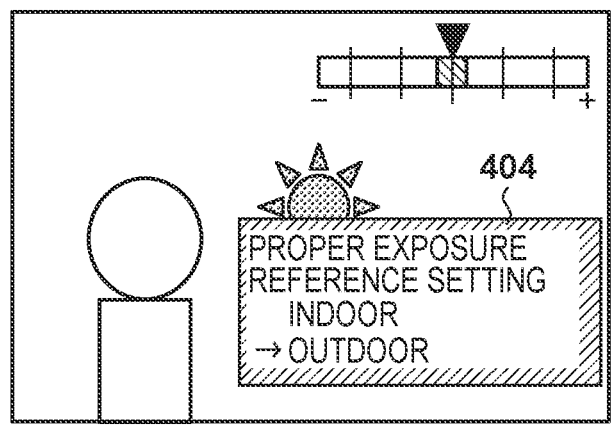
Figure 4C:
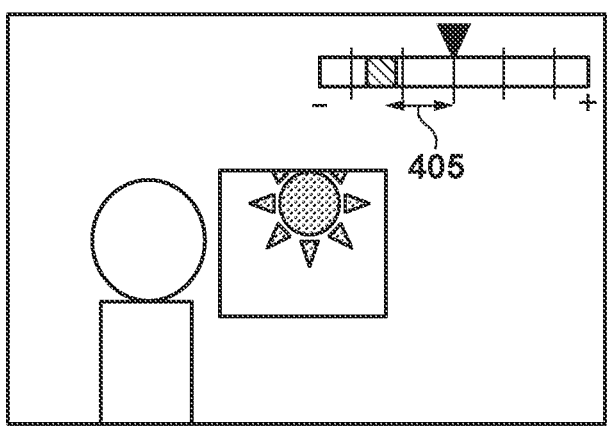

Before describing the UI according to this embodiment of the invention, an example in which a conventional UI is applied in an image capture apparatus that can change a reference value of proper exposure will be described with reference to FIGS. 4A to 4C. In FIGS. 4A to 4C, an exposure indicator 400, a proper exposure indicator 401, and an exposure indicator 402 indicating an exposure amount that is based on exposure conditions that are currently set are displayed as a UI for exposure setting. The UI for exposure setting is superimposed on a live view image, for example, and is displayed on the display unit 28. The proper exposure indicator 401 indicates an exposure amount corresponding to exposure conditions that are determined using an automatic exposure control function, and indicates a fixed position of the exposure indicator 400 (usually, the center in the longitudinal direction).

When automatic exposure control is enabled, exposure conditions are automatically determined such that the exposure indicator 402 is displayed at a position indicated by the proper exposure indicator 401. During manual exposure setting, by setting exposure conditions such that the exposure indicator 402 is displayed at the position indicated by the proper exposure indicator 401, the user can perform shooting with proper exposure that is acquired through automatic exposure control. In addition, by setting exposure conditions such that the exposure indicator 402 is displayed on the left (right) side of the position indicated by the proper exposure indicator 401, the user can perform shooting such that a subject appears more brightly (darkly) than with proper exposure that is acquired through automatic exposure control.

For example, shooting in which the shooting environment changes from indoor to outdoor, and further returns to indoor is envisioned. FIG. 4A shows a display example of a UI during initial indoor photography. Here, a reference value for indoor photography is set as a reference value of proper exposure. Therefore, in the case where shooting is performed with an exposure amount indicated by the proper exposure indicator 401, an image with brightness (for example, an output level of 40%) that is based on the reference value for indoor photography is acquired.

Assume that the shooting environment changes to outdoor, the user displays a reference value setting screen 404 through the console unit 70, and the reference value of proper exposure is changed from the reference value for indoor photography to a reference value for outdoor photography (FIG. 4B). In this case, even if the display position of the exposure indicator 402 is not different from that in FIG. 4A, the brightness of an image that is acquired through shooting matches brightness corresponding to the reference value for outdoor photography (for example, an output level of 50%).

In the case of continuing shooting back in the indoor environment in the state where the reference value of proper exposure is set to the reference value for outdoor photography, if shooting is performed with proper exposure that is determined through automatic exposure control, shooting is performed more brightly than the brightness corresponding to the reference value for indoor photography. It suffices for the reference value of proper exposure to be returned to the reference value for indoor photography through the menu screen as shown in FIG. 4B, but when shooting a moving image while moving from outdoor to indoor, or the like, there are cases where shooting cannot be suspended for a menu operation. In such cases, the user is required to perform exposure compensation to the negative side so as to perform shooting with brightness corresponding to the reference value for indoor photography. However, the user needs to understand an exposure compensation amount indicated by an arrow 405 in FIG. 4C in order to appropriately perform exposure compensation.

Figure 5A:
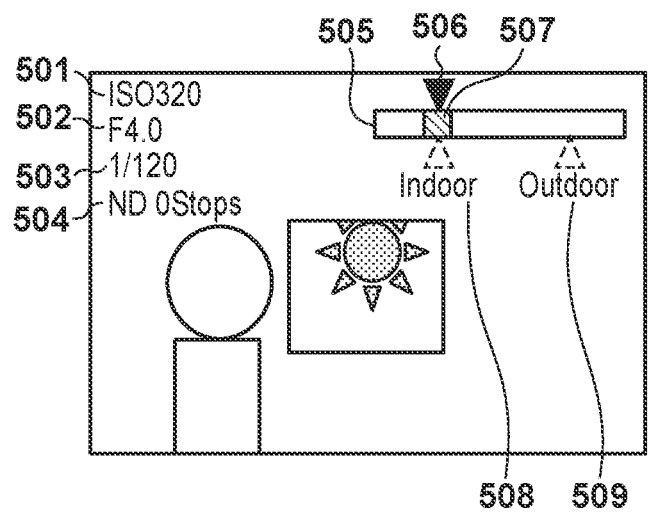
FIGS. 5A to 5C are schematic diagrams showing examples of a user interface according to an embodiment of the invention.
Figure 5B:
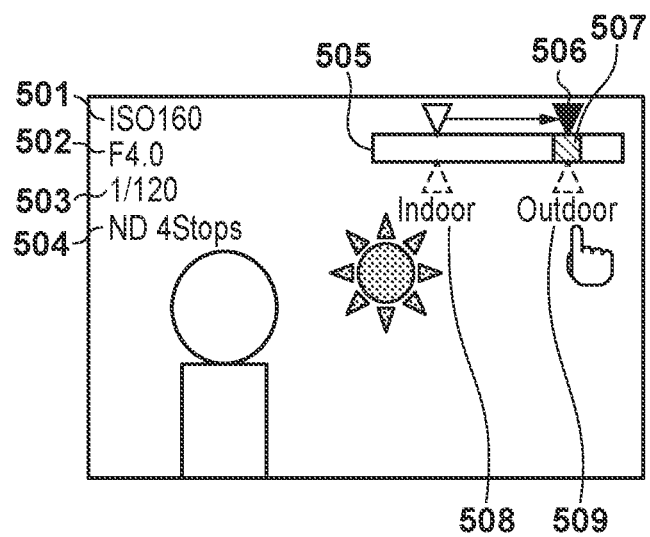
Figure 5C:
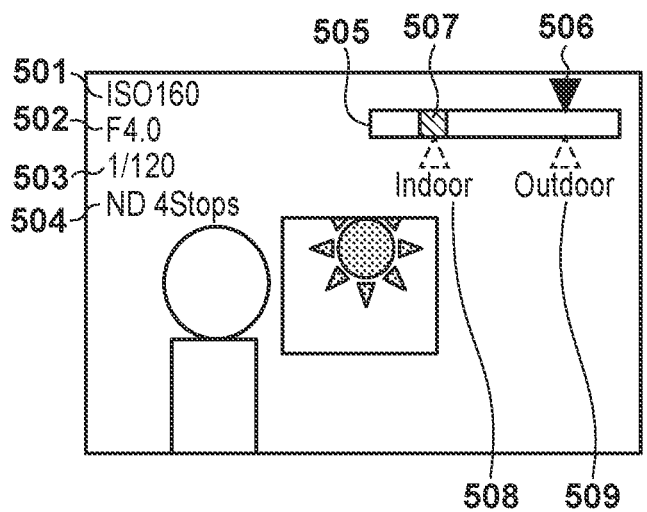

FIGS. 5A to 5C are diagrams schematically showing information display examples in the state where the display unit 28 functions as an electronic view finder. The system control unit 50 superimposes an image that indicates various types of information on a moving image to be displayed, and displays the image on the display unit 28, thereby realizing display shown in FIGS. 5A to 5C.

The current values of shooting sensitivity 501, an aperture value 502, a shutter speed 503, and an ND filter density 504 are indicated in numerical values. In a bar-like brightness indicator 505 extending in the horizontal direction, a position in the horizontal direction indicates brightness, where the right end corresponds to the highest brightness and the left end corresponds to the highest darkness. Note that the brightness indicator 505 may indicate brightness based on the magnitude of an output level, for example. In the brightness indicator 505, an exposure indicator 507 indicating brightness of a subject that is acquired under the exposure conditions currently set in the image capture apparatus 100 is displayed at a horizontal position corresponding to brightness.

An indoor reference value indicator 508 and an outdoor reference value indicator 509 are indicators that indicate brightness by pointing at horizontal positions in the brightness indicator 505. As described above, in this embodiment, a UI is provided in which brightness of a subject that is acquired when shooting is performed with proper exposure that is based on each reference value that can be set and brightness of the subject that is acquired when shooting is performed under current exposure conditions are comparably presented on the same axis, namely the brightness indicator 505. The brightness indicated by the indoor reference value indicator 508 and the brightness indicated by the outdoor reference value indicator 509 are brightness of a subject that is acquired when shooting is performed under exposure conditions determined through automatic exposure control in which a reference value for proper exposure that is defined for indoor photography and a reference value for proper exposure that is defined for outdoor photography are respectively used. Therefore, the brightness indicated by the indoor reference value indicator 508 and the brightness indicated by the outdoor reference value indicator 509 correspond to output levels of 40% and 50%.

In addition, a current reference value indicator 506 indicates a reference value of proper exposure that is currently set. Therefore, in FIG. 5A, it is indicated that a reference value for indoor photography has been set. In addition, in FIG. 5A, the horizontal position of the exposure indicator 507 matches the horizontal position of the indoor reference value indicator 508. Therefore, it is understood that the current exposure conditions correspond to proper exposure in automatic exposure control in which the reference value for indoor photography is used, and a subject is to be shot with brightness (an output level of 40%) corresponding to the reference value for indoor photography. Note that the display form of one indicator (a color, brightness, a shape, a display method, etc.) corresponding to the currently set reference value, out of the indoor reference value indicator 508 and the outdoor reference value indicator 509, may be different from the display form of the other indicator, instead of providing the current reference value indicator 506.

The user can set (change) a reference value of proper exposure that is used in automatic exposure control by operating the menu screen as shown in FIG. 4B through the console unit 70. As described above, a configuration may be adopted in which an output level and the dynamic range of luminance can be directly specified in numerical values. In addition, in this embodiment, by selecting one of the exposure indicator 507, the indoor reference value indicator 508, and the outdoor reference value indicator 509, it is possible to set (change) a reference value of proper exposure that is used for automatic exposure control without performing a menu operation.

If the display unit 28 is a touch display, a configuration can be adopted in which an indicator can be selected in accordance with an operation of touching the indicator. Alternatively, a configuration can be adopted in which indicators are associated with specific console members included in the console unit 70, and an indicator corresponding to an operated member is handled as having been selected. In addition, a configuration may also be adopted in which the reference value can be changed by the user moving the position of the current reference value indicator 506. If the display unit 28 is a touch display, a configuration can be adopted in which the current reference value indicator 506 can be moved in accordance with an operation of dragging the current reference value indicator 506 in the horizontal direction, or an operation of selecting one of a plurality of predetermined positions, for example. A function for moving the current reference value indicator 506 may be assigned to a console member included in the console unit 70.

FIG. 6 is a flowchart related to an operation of displaying the indicators 506 to 509 in this embodiment. The operation shown in FIG. 6 can be executed as a portion of processing for changing a reference value, which has been described above with reference to FIG. 3, for example. Note that the brightness indicator 505 and other pieces of information 501 to 504 are assumed to be displayed already.

In step S601, the system control unit 50 displays, on the display unit 28, a first indicator indicating brightness (first brightness) of a subject in an image shot with proper exposure that is determined through automatic exposure control in which one of a plurality of reference values that can be set is used. Here, the first indicator is the indoor reference value indicator 508. Here, the system control unit 50 displays the indoor reference value indicator 508 to a point at a horizontal position of the brightness indicator 505 corresponding to the first brightness. The system control unit 50 can determine actual display coordinates according to the shapes and sizes of the indicators and the display position and the size of the brightness indicator 505.

In step S602, the system control unit 50 displays, on the display unit 28, a second indicator indicating brightness (second brightness) of a subject in an image shot with proper exposure that is determined through automatic exposure control in which another one of the reference values that can be set is used. Here, the second indicator is the outdoor reference value indicator 509. Here, the system control unit 50 displays the outdoor reference value indicator 509 to a point at a horizontal position of the brightness indicator 505 corresponding to the second brightness.

In step S603, the system control unit 50 displays, on the display unit 28, a third indicator (the exposure indicator 507) indicating brightness (third brightness) of a subject in an image shot under exposure conditions that are currently set. Here, the system control unit 50 displays the exposure indicator 507 at a horizontal position of the brightness indicator 505 corresponding to the third brightness.

In step S604, the system control unit 50 determines whether or not an operation of selecting one of the exposure indicator 507, the indoor reference value indicator 508, and the outdoor reference value indicator 509 has been detected. If it is determined that an operation of selecting an indicator has been detected, the system control unit 50 advances the procedure to steps S605 to S607 according to the selected indicator, and if it is not determined that an operation of selecting an indicator has been detected, repeatedly executes step S604.

Here, if it is determined that an operation of selecting the indoor reference value indicator 508 has been detected, the procedure advances to step S605, and if it is determined that an operation of selecting the outdoor reference value indicator 509 has been detected, the procedure advances to step S606, and if it is determined that an operation of selecting the exposure indicator 507 has been detected, the procedure advances to step S607.

In step S605, the system control unit 50 sets (changes) the reference value of proper exposure to the reference value for indoor photography. In step S606, the system control unit 50 sets (changes) the reference value of proper exposure to the reference value for outdoor photography. In step S607, the system control unit 50 sets the reference value of proper exposure to the current reference value. In addition, in the case where the reference value of proper exposure was changed in steps S605 to S607, the system control unit 50 updates display of the current reference value indicator 506 and the exposure indicator 507. Processing in steps S605 to S607 corresponds to processing in step S301 in FIG. 3. Note that step S607 does not necessarily need to be executed.

For example, assume that, from a state where the shooting location is indoor and the reference value for indoor photography is set (FIG. 5A), the shooting location changes to outdoor. Subsequently, when the user selects the outdoor reference value indicator 509, the system control unit 50 changes the reference value of proper exposure to the reference value for outdoor photography. As described with reference to FIG. 3, when the reference value of proper exposure is changed, the system control unit 50 changes the exposure index. Accordingly, the value of the shooting sensitivity 501 changes. Here, the reference value of proper exposure is changed to a higher value, and thus the shooting sensitivity decreases. Due to the reference value of proper exposure having been changed to the reference value for outdoor photography, the display unit 28 enters a state indicated by FIG. 5B. Here, a state is shown in which, by the user having changed the density of the ND filter, an aperture value and shutter speed same as those set for indoor photography are determined through automatic exposure control. Note that, in the case of manually setting exposure conditions, it suffices for the user to set exposure conditions so as to display the exposure indicator 507 at the horizontal position pointed by a reference value indicator indicated by the current reference value indicator 506. Therefore, even in the case of performing shooting indoor in the state where the reference value for outdoor photography is set as described with reference to FIGS. 4A to 4C, it is possible to appropriately and easily perform exposure compensation.

As described above, in this embodiment, in an image capture apparatus that can change a reference value of proper exposure that is used in automatic exposure control, display is performed such that brightness of a subject in an image that has been shot under current exposure conditions can be compared with that under proper exposure that is based on a predetermined reference value. In particular, by displaying each brightness on a position on the same axis, it is possible to easily set exposure conditions and a reference value of proper exposure for acquiring an image in which a subject is shot with desired brightness. In particular, by displaying brightness of a subject on an axis indicating the magnitude of an output level, it is possible to intuitively set a reference value or exposure conditions intended by the user.

Note that, in this embodiment, for ease of describing and understanding, a case has been described in which two reference values for indoor photography and outdoor photography are provided as a plurality of predetermined reference values. However, the number of the plurality of reference values that can be set in the image capture apparatus may be three or more. In addition, reference values that can be set may be based on classification other than classification of indoor and outdoor, such as a shooting mode or a scene detection result of the image capture apparatus, or the like.

Fourth Embodiment

Next, a fourth embodiment of the present invention will be described. This embodiment relates to a user interface (UI) for providing information that is useful when changing a reference value of proper exposure. This embodiment can be executed in combination with the first to third embodiments, and thus description will be given using the configuration of the image capture apparatus 100.

The information that is provided in this embodiment is information regarding the influence of change in a reference value of proper exposure on the image quality. For example, the information may be information regarding the number of stops from proper exposure to a saturated exposure amount, a sensor noise amount, a dynamic range, and the like, according to the reference value. Here, as an example, a configuration will be described in which information regarding a sensor noise amount is provided.

In this embodiment, assume that setting related to the allowable maximum amount of influence on the image quality has been performed. It is sufficient that, when a noise amount is taken into consideration in terms of the image quality, a gain amount (allowable maximum gain amount) of the image sensor corresponding to the allowable maximum noise amount is set in advance. A method for setting the allowable maximum gain amount is not particularly limited, but, for example, the user can change the shooting sensitivity and perform shooting while maintaining proper exposure during test shooting, visually check noise included in an acquired image, and determine an allowable maximum gain amount. A noise amount may be checked by displaying the image on the display unit 28, for example, or may be checked by displaying the image on an external apparatus (a personal computer, etc.). For example, a noise amount can be checked by enlarging and displaying a portion of the image as shown in FIG. 7A. Note that a shooting mode for setting the allowable maximum gain amount may be prepared. In the shooting mode for setting the allowable maximum gain amount, for example, the system control unit 50 displays a current sensor gain amount 710 on the display unit 28 as shown in FIG. 7A. Other display may be similar to those in FIGS. 5A to 5C.

The user determines the maximum sensitivity (allowable maximum sensitivity) according to which a noise amount can be allowed from images shot with proper exposure of different shooting sensitivities, and sets the maximum sensitivity in the image capture apparatus 100 through a menu screen, for example. The system control unit 50 stores, in the non-volatile memory 56, for example, a gain amount corresponding to the allowable maximum sensitivity that has been set, in association with the reference value of proper exposure used during shooting. Note that a configuration may be adopted in which a sensor gain amount can be directly set instead of setting the allowable maximum gain amount based on the shooting sensitivity. Note that the user may set the allowable maximum sensitivity and allowable maximum gain amount without performing test shooting. Here, for example, ISO3200 is set as the allowable maximum sensitivity through test shooting in which the reference value for indoor photography is used, and a corresponding sensor gain amount of 24 dB is set as the maximum allowable gain amount.

UI display in a shooting standby state and UI display when a moving image is being recorded are basically similar to those in the third embodiment shown in FIGS. 5B and 5C. Note that sensor gain amounts 710 to 712 corresponding to the current reference value indicator 506, the indoor reference value indicator 508, and the outdoor reference value indicator 509 are displayed additionally as information regarding the image quality corresponding to the reference amounts (FIG. 7B).

Figure 8:
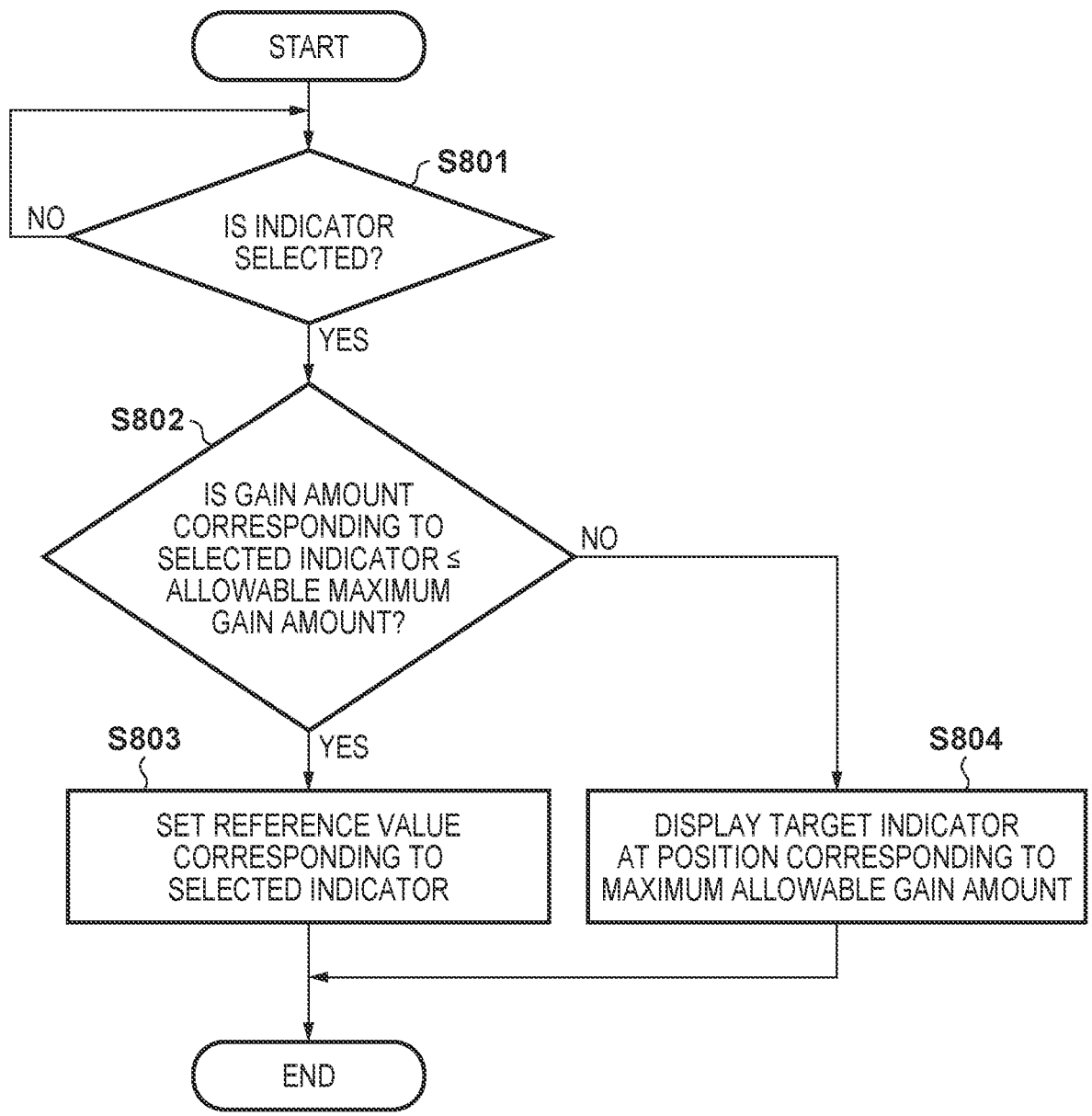
FIG. 8 is a flowchart related to an operation of an image capture apparatus according to an embodiment of the invention.

FIG. 8 is a flowchart related to an operation of the system control unit 50 in response to an indicator operation in a shooting standby state and an indicator operation when a moving image is being recorded.

In step S801, the system control unit 50 determines whether or not an operation of selecting an indicator has been detected, similar to step S604, and if it is determined that an operation of selecting an indicator has been detected, advances the procedure to step S802, and if it is not determined that an operation of selecting an indicator has been detected, repeatedly executes step S801.

In step S802, the system control unit 50 determines whether or not a sensor gain amount corresponding to the selected indicator is smaller than or equal to the maximum allowable gain amount that is set, and if it is determined that the sensor gain amount is smaller than or equal to the maximum allowable gain amount, advances the procedure to step S803, and otherwise advances the procedure to step S804.

In step S803, the system control unit 50 sets a reference value corresponding to the selected indicator. This corresponds to processing in step S605 to step S607 in the third embodiment.

On the other hand, in step S804, the system control unit 50 displays a target indicator on the display unit 28 without setting the reference value corresponding to the selected indicator. FIG. 7C shows an example of a target indicator 721. The target indicator 721 is an indicator that indicates a reference value (fourth brightness) that is the maximum allowable amount whose influence on the image quality is set in advance.

For example, assume that the shooting environment changes from indoor to outdoor, and the user selects the outdoor reference value indicator 509 in an attempt to change the reference value of proper exposure to the reference value for outdoor photography. A sensor gain amount corresponding to the reference value for outdoor photography is 27 dB, which exceeds the maximum allowable gain amount, namely 24 dB. In this case, the system control unit 50 displays the target indicator 721 on the display unit 28 without changing the reference value of proper exposure. At this time, a warning message indicating that the noise amount will exceed the allowable amount if the selected reference value is set and the like may be displayed additionally on the display unit 28. In addition, as shown in FIG. 7C, information regarding the image quality (here, a sensor gain amount) may be displayed in association with the target indicator 721.

The user can set exposure conditions under which the subject appears more brightly in a range in which the noise amount does not exceed the maximum allowable amount, by changing exposure conditions such that the exposure indicator 507 is displayed between the current horizontal position and the horizontal position indicated by the target indicator 721. The user can then change the reference value of proper exposure such that the current exposure amount causes proper exposure, by selecting the exposure indicator 507. FIG. 7D shows a state where exposure conditions under which the subject appears most brightly in a range in which the noise amount does not exceed the maximum allowable amount are set. When an operation of selecting the exposure indicator 507 is detected, the system control unit 50 changes the reference value of proper exposure such that the current exposure amount is the proper exposure, updates the display position of the current reference value indicator 506, and ends display of the target indicator 721 (FIG. 7E).

Note that, in the case of setting exposure conditions under which a subject appears most brightly within a range in which the noise amount does not exceed the maximum allowable amount when automatic exposure control is enabled, it suffices for the user to select the target indicator 721. When an operation of selecting the target indicator 721 is detected, the system control unit 50 changes the reference value of proper exposure such that brightness corresponding to the target indicator 721 corresponds to the proper exposure. The system control unit 50 then updates the display position of the current reference value indicator 506, and ends display of the target indicator 721. Due to automatic exposure control, the exposure conditions are changed, and the horizontal position of the exposure indicator 507 matches the horizontal position of the current reference value indicator 506 (FIG. 7E).

Note that, here, a configuration has been described in which, if it is not determined that the sensor gain amount corresponding the selected indicator is smaller than or equal to the maximum allowable gain amount (or if it is determined that the maximum allowable gain amount is exceeded), the target indicator 721 is displayed. However, a configuration may be adopted in which, in the case where one or more sensor gain amounts corresponding to a plurality of reference values that can be set exceed the maximum allowable gain amount, the target indicator is always displayed. By displaying an indicator that indicates a reference value at which influence on the image quality corresponds to the maximum allowable amount that has been set in advance, as one of indicators of a plurality of reference values that can be selected, the user can select the indicator in consideration of whether to prioritize influence on the image quality or to prioritize brightness of the image.

In addition, setting of a reference value corresponding to a sensor gain amount that exceeds the allowable gain amount may be permitted if the user approves it. For example, in the case where the maximum allowable gain amount is exceeded if the reference value corresponding to the selected indicator is set, the system control unit 50 can display a warning message, and inquire the user whether or not to really change the reference value. In the case where the user instructs to change the reference value in response to the warning message, the system control unit 50 sets the reference value corresponding to the sensor gain amount that exceeds the allowable gain amount.

According to this embodiment, in an electronic apparatus that has an image capturing function that makes it possible to change a reference value of proper exposure, information regarding influence of reference values on the image quality is displayed in association with the reference values that can be set. Therefore, the user can set a reference value of proper exposure in consideration of influence on the image quality.

In addition, an indicator that indicates a reference value whose influence on the image quality corresponds to the maximum allowable amount that has been set in advance is displayed, as one of indicators of a plurality of reference values that can be selected. Therefore, the user can easily set a reference value in a range in which influence on the image quality does not exceed the maximum allowable amount.

Note that, in this embodiment, a configuration has been described in which a sensor gain amount that affects a noise amount is displayed as information regarding influence of a reference value of proper exposure on the image quality. However, the information regarding influence of a reference value of proper exposure on the image quality may be other information such as the magnitude of a dynamic range or the number of stops from a proper exposure amount to a saturated exposure amount. In addition, a configuration may be adopted in which the information is displayed in relative values based on values corresponding to current reference values, instead of being displayed in absolute values.

As described above, the present invention has been described in detail based on its exemplary embodiments, but the present invention is not limited to these specific embodiments, and various modes without departing from the gist of this invention are also included in the present invention. Furthermore, each of the above embodiments merely represents one embodiment of the present invention, and embodiments can also be combined as appropriate.

Note that various types of control that have been described above as being executed by the system control unit 50 may be performed by a single item of hardware, or overall control of the apparatus may be performed by a plurality of items of hardware (for example, a plurality of processors or circuits) sharing the processing.

In addition, in the embodiments above, cases have been described in which the present invention is applied to an image capture apparatus such as a digital camera, as an example. However, the present invention can be applied to any electronic apparatus that has (or can be equipped with) an image capturing function that makes it possible to change a reference value of proper exposure in automatic exposure control. For example, the present invention can be applied to ordinary electronic apparatuses such as personal computers, tablet terminals, mobile phones, smartphones, portable media players, printers, digital photo frames, game machines, electronic book reader, and home electric appliances.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-011847, filed on Jan. 26, 2018, which is hereby incorporated by reference herein in its entirety.

What is claimed is:

1. An electronic apparatus comprising:
at least one memory and at least one processor which function as a control unit configured to:
set a first brightness for an image in which a subject is shot using automatic exposure control with proper exposure based on a first reference value for indoor photography;
set a second brightness for an image in which the subject is shot using automatic exposure control with proper exposure based on a second reference value for outdoor photography, wherein the first brightness and the second brightness can be set separately;
display a brightness indicator indicative of brightness level;
simultaneously display the brightness indicator and:
(i) a first indicator indicating, by association with the brightness indicator, the first brightness set for indoor photography,
(ii) a second indicator indicating, by association with the brightness indicator, the second brightness set for outdoor photography, and
(iii) a third indicator indicating, by association with the brightness indicator, a current third brightness of a live image in which the subject is shot under current exposure conditions,
wherein the first indicator and the second indicator are displayed in a manner which identifies that the first brightness is for indoor photography and the second brightness is for outdoor photography, and
wherein the first, second, and third indicators are continuously displayed, with at least one label related to the indicators and superimposed on the live image, and visually illustrate, on the brightness indicator, relative respective brightness levels of the first brightness set for indoor photography, the second brightness set for outdoor photography, and the current third brightness of the live image during a manual exposure adjustment which changes a brightness reference value for proper exposure under the current exposure conditions.

2. The electronic apparatus according to claim 1, wherein each of the first brightness, second brightness, and third brightness is a magnitude of an output level of a signal.

3. The electronic apparatus according to claim 1, wherein the first, second, and third indicators are displayed, with the at least one label related to the indicators, to indicate positions on one axis of the brightness indicator.

4. The electronic apparatus according to claim 1, wherein the first reference value and the second reference value are determined in advance, and wherein the reference value for proper exposure under the current exposure conditions is changed without performing a menu operation.

5. The electronic apparatus according to claim 1, wherein the control unit is further configured to display information regarding image quality corresponding to the first reference value and/or the second reference value.

6. The electronic apparatus according to claim 5, wherein the information regarding image quality is information regarding one of a noise amount, a dynamic range, and the number of stops between a proper exposure amount and a saturated exposure amount.

7. The electronic apparatus according to claim 6, wherein the information regarding image quality is indicated as a relative value to information corresponding to a current reference value.

8. The electronic apparatus according to claim 1, wherein the control unit is further configured to display a fourth indicator indicating fourth brightness that is brightness corresponding to a maximum allowable amount predetermined regarding influence on image quality.

9. The electronic apparatus according to claim 1, wherein, if an operation of selecting one of the first, second, or third indicators is detected, the control unit sets a reference value corresponding to the selected indicator, as a reference value of proper exposure.

10. A control method of an electronic apparatus comprising:
setting a first brightness for an image in which a subject is shot using automatic exposure control with proper exposure based on a first reference value for indoor photography;
setting a second brightness for an image in which the subject is shot using automatic exposure control with proper exposure based on a second reference value for outdoor photography, wherein the first brightness and the second brightness can be set separately;
displaying a brightness indicator indicative of brightness level;
simultaneously display the brightness indicator and:
(i) a first indicator indicating, by association with the brightness indicator, the first brightness set for indoor photography,
(ii) a second indicator indicating, by association with the brightness indicator, the second brightness set for outdoor photography, and
(iii) a third indicator indicating, by association with the brightness indicator, a current third brightness of a live image in which the subject is shot under current exposure conditions, wherein the first indicator and the second indicator are displayed in a manner which identifies that the first brightness is for indoor photography and the second brightness is for outdoor photography, and wherein the first, second, and third indicators are continuously displayed, with at least one label related to the indicators and superimposed on the live image, and visually illustrate, on the brightness indicator, relative respective brightness levels of the first brightness set for indoor photography, the second brightness set for outdoor photography, and the current third brightness of the live image during a manual exposure adjustment which changes a brightness reference value for proper exposure under the current exposure conditions.

11. A non-transitory computer-readable recording medium that stores a program for causing a computer to function as an electronic apparatus comprising a control unit configured to:

set a first brightness for an image in which a subject is shot using automatic exposure control with proper exposure based on a first reference value for indoor photography;

set a second brightness for an image in which the subject is shot using automatic exposure control with proper exposure based on a second reference value for outdoor photography, wherein the first brightness and the second brightness can be set separately;

display a brightness indicator indicative of brightness level;

simultaneously display the brightness indicator and:

(i) a first indicator indicating, by association with the brightness indicator, the first brightness set for indoor photography, (ii) a second indicator indicating, by association with the brightness indicator, the second brightness set for outdoor photography, and (iii) a third indicator indicating, by association with the brightness indicator, a current third brightness of a live image in which the subject is shot under current exposure conditions, wherein the first indicator and the second indicator are displayed in a manner which identifies that the first brightness is for indoor photography and the second brightness is for outdoor photography, and wherein the first, second, and third indicators are continuously displayed, with at least one label related to the indicators, and superimposed on the live image, and visually illustrate, on the brightness indicator, relative respective brightness levels of the first brightness set for indoor photography, the second brightness set for outdoor photography, and the current third brightness of the live image during a manual exposure adjustment which changes a brightness reference value for proper exposure under the current exposure conditions.

* * * * *